US012362119B2

(12) United States Patent
Lu et al.

(10) Patent No.: US 12,362,119 B2
(45) Date of Patent: Jul. 15, 2025

(54) ELECTRIC OPERATING DEVICE FOR CIRCUIT BREAKER

(71) Applicant: ZHEJIANG CHINT ELECTRICS CO., LTD., Zhejiang (CN)

(72) Inventors: Kejun Lu, Zhejiang (CN); Fan Yang, Zhejiang (CN)

(73) Assignee: ZHEJIANG CHINT ELECTRICS CO., LTD. (CN)

(*) Notice: Subject to any disclaimer, the term of this patent is extended or adjusted under 35 U.S.C. 154(b) by 433 days.

(21) Appl. No.: 17/781,892

(22) PCT Filed: Nov. 15, 2020

(86) PCT No.: PCT/CN2020/128889
§ 371 (c)(1),
(2) Date: Jun. 2, 2022

(87) PCT Pub. No.: WO2021/109840
PCT Pub. Date: Jun. 10, 2021

(65) Prior Publication Data

US 2023/0019861 A1 Jan. 19, 2023

(30) Foreign Application Priority Data

Dec. 6, 2019 (CN) ......................... 201911242376.2

(51) Int. Cl.
*H01H 3/40* (2006.01)
*H01H 3/26* (2006.01)
(Continued)

(52) U.S. Cl.
CPC .......... *H01H 71/1009* (2013.01); *H01H 3/26* (2013.01); *H01H 3/40* (2013.01); *H01H 71/02* (2013.01)

(58) Field of Classification Search
CPC ............ H01H 3/26; H01H 3/40; H01H 71/02; H01H 71/1009; H01H 71/70; H01H 2071/665
See application file for complete search history.

(56) References Cited

U.S. PATENT DOCUMENTS 4,990,873 A * 2/1991 Grunert .................. H01H 71/70 335/14
5,323,131 A * 6/1994 Castonguay ............. H01H 9/20 335/71
6,963,042 B1 * 11/2005 Kouris .................. H01H 71/70 335/14

FOREIGN PATENT DOCUMENTS

CN 1835142 A 9/2006
CN 108493060 A 9/2018
(Continued)

OTHER PUBLICATIONS

International Search Report, mailed Jan. 28, 2021 in corresponding PCT International Application No. PCT/CN2020/128889.
(Continued)

*Primary Examiner* — Vanessa Girardi
(74) *Attorney, Agent, or Firm* — OSTROLENK FABER LLP

(57) ABSTRACT

An electric operating device for a circuit breaker that includes a housing, a transmission mechanism is installed in the housing, and a side wall of the housing serves as an operation surface and is provided with a first sliding groove communicated with the interior of the housing; a sliding rod is installed in the housing; a driving member controlled by the transmission mechanism is installed on the sliding rod; the driving member is provided with a closing operation portion and an opening operation portion; the driving member passes through the first sliding groove and extends out of the housing; the driving member moves along the sliding rod under the control of the transmission mechanism; and the
(Continued)

closing operation portion and the opening operation portion operate a handle of the circuit breaker to be closed and opened respectively.

15 Claims, 10 Drawing Sheets

(51) Int. Cl.
*H01H 71/02* (2006.01)
*H01H 71/10* (2006.01)

(56) References Cited

FOREIGN PATENT DOCUMENTS

| | | | |
|---|---|---|---|
| CN | 108717922 | A | 10/2018 |
| CN | 109256303 | A | 1/2019 |
| CN | 111477505 | A | 7/2020 |
| CN | 111477514 | A | 7/2020 |
| CN | 111477515 | A | 7/2020 |
| CN | 211125534 | U | 7/2020 |
| CN | 211125535 | U | 7/2020 |
| CN | 211125536 | U | 7/2020 |
| CN | 211125537 | U | 7/2020 |
| CN | 211208366 | U | 8/2020 |
| CN | 211350504 | U | 8/2020 |
| JP | H07-085766 | A | 3/1995 |
| JP | H11-120887 | A | 4/1999 |
| JP | 2001-351497 | A | 12/2001 |

OTHER PUBLICATIONS

Written Opinion, mailed Jan. 28, 2021 in corresponding PCT International Application No. PCT/CN2020/128889.
Office Action dated Oct. 6, 2022, issued in corresponding Japanese Patent Application No. 2022-533210.
Extended European Search Report dated Dec. 8, 2023, issued in corresponding European Patent Application No. 20895923.9.

* cited by examiner

ELECTRIC OPERATING DEVICE FOR CIRCUIT BREAKER

CROSS-REFERENCE TO RELATED APPLICATIONS

The present application is a 35 U.S.C. §§ 371 national stage application of International Application No. PCT/CN2020/128889, filed Nov. 15, 2020, which claims priority to Chinese Patent Application No. 201911242376.2, filed Dec. 6, 2019, the contents of both of which are incorporated herein by reference.

FIELD OF THE INVENTION

The present invention relates to the technical field of circuit breakers, and more particularly, to an electric operating device for a circuit breaker.

BACKGROUND OF THE INVENTION

The existing communication cabinets or intelligent control cabinets all need to have the functions of automatic control and remote control, and are basically controlled by using contactors for the convenience of control. However, due to the infrequent operation, the contactors have the disadvantages of large energy consumption and high cost during the use process. If the contactor is replaced by an electrically-operated circuit breaker, an electric operating device is required, which increases the cost. Therefore, it is very necessary to design a device that can cooperate with other installation devices to realize that one electric operating mechanism controls a plurality of handles of a plurality of miniature circuit breakers to reduce the energy consumption and cost of the communication cabinets or intelligent control cabinets.

SUMMARY OF THE INVENTION

An objective of the present invention is to overcome the defects of the prior art and provide an electric operating device for a circuit breaker with a simple structure and high reliability.

In order to achieve the above object, the present invention adopts the following technical solutions:

An electric operating device for a circuit breaker, comprising a housing, wherein a transmission mechanism is installed in the housing, and a side wall of the housing serves as an operation surface and is provided with a first sliding groove communicated with the interior of the housing; a sliding rod is installed in the housing; a driving member controlled by the transmission mechanism is installed on the sliding rod; the driving member is provided with a closing operation portion and an opening operation portion; the driving member passes through the first sliding groove and extends out of the housing; the driving member moves along the sliding rod under the control of the transmission mechanism; and the closing operation portion and the opening operation portion operate a handle of the circuit breaker to be closed and opened respectively.

Further, the transmission mechanism comprises a motor and a gear set connected to the motor; the gear set comprises an opening and closing output gear which is provided with a transmission shaft; the driving member is provided with a linkage groove cooperating with the transmission shaft; the motor drives the gear set to rotate; and the driving member slides on the sliding rod through the cooperation between the driving shaft of the opening and closing output gear and the linkage groove of the driving member, so as to operate the handle of the circuit breaker to be closed or opened.

Further, the opening and closing output gear comprises a closing output gear and an opening output gear; the transmission shaft on the opening and closing output gear comprises a closing transmission shaft arranged on the closing output gear and an opening transmission shaft arranged on the opening output gear; the driving member comprises a closing driving member and an opening driving member; and the closing driving member and the opening driving member are respectively provided with linkage grooves cooperating with the closing transmission shaft and the opening transmission shaft.

Further, the closing driving member comprises a first linkage member and a closing member, wherein the first linkage member is installed on the sliding rod, the closing member is installed on the sliding rod and is in linkage with the first linkage member, the first linkage member is provided with a first linkage groove cooperating with the closing transmission shaft, and the closing member is provided with a closing operation portion; and/or the opening driving member comprises a second linkage member and an opening member, wherein the second linkage member is installed on the sliding rod, the opening member is installed on the sliding rod and is in linkage with the second linkage member, the second linkage member is provided with a second linkage groove cooperating with the opening transmission shaft, and the opening member is provided with an opening operation portion.

Further, each of the first linkage groove and the second linkage groove comprises an open end and a closed end; the closed end of the first linkage groove cooperates with the closing transmission shaft to drive the first linkage member to move; the open end of the first linkage groove is used to enable the closing transmission shaft to be rotated out after the closing is completed, thereby realizing the separation from the first linkage member; the closed end of the second linkage groove cooperates with the opening transmission shaft to drive the second linkage member to move; and the open end of the second linkage member is used to enable the opening transmission shaft to be rotated out after the opening is completed, thereby realizing the separation from the second linkage member.

Further, the open end of the first linkage groove and the open end of the second linkage groove are staggered; and a direction from the open end to the closed end of the first linkage groove is opposite to a direction from the open end to the closed end of the second linkage groove.

Further, the first linkage groove comprises a first straight segment and a first circular arc segment that communicate with each other; the first straight segment is perpendicular to the sliding rod; the closed end is located at the end of the first straight segment; the open end is located at the end of the first circular arc segment; and the second linkage groove comprises a second straight segment and a second circular arc segment that are communicated in sequence, wherein the second straight segment is parallel to the sliding rod; the second circular arc segment is close to a semi-circular arc shape; the closed end is located at the end of the second circular arc segment; one side of the second circular arc segment is a circular arc side wall, and the other side thereof is a straight side wall; and the open end is located at the end of the second straight segment.

Further, an elastic buffer member is arranged between the first linkage member and the closing member, and/or an elastic buffer member is arranged between the second linkage member and the opening member.

Further, the opening and closing output gear is an oval gear.

Further, both the closing output gear and the opening output gear are oval gears.

Further, the closing output gear and the opening output gear are meshed with each other; in the early stage of closing, an oval long side of the opening output gear is in contact and cooperation with an oval short side of the closing output gear, such that the closing operation portion obtains a larger closing driving force; and in the later stage of closing, the oval short side of the opening output gear is in contact and cooperation with the oval long side of the closing output gear, such that the closing operation portion obtains a faster closing speed.

Further, the gear set also comprises a three-stage gear; the closing output gear and the three-stage gear are driven by the same rotating shaft; a rotating shaft of the closing output gear is provided eccentrically; the opening output gear is meshed with the closing output gear; a rotating shaft of the opening output gear is provided eccentrically; the closing output gear is provided with a closing transmission shaft for connecting with the closing transmission member; and the opening output gear is provided with an opening transmission shaft for connecting with the opening driving member.

Further, a side wall on the housing, which is opposite to the operation surface serves as a connection surface; and a moving device for driving the housing to move is installed on the connection surface.

Further, the first linkage member is of a U-shaped structure which is formed by sequentially connecting a first linkage wall, a third linkage wall and a second linkage wall and has an opening facing the first sliding groove; the first linkage groove is formed in the third linkage wall; each of the first linkage wall and the second linkage wall which are opposite to each other is provided with a through hole for the sliding rod to pass through; the closing member is arranged inside the first linkage member, and is of a U-shaped structure which is formed by sequentially connecting a first side wall, a first connecting wall and a second side wall; each of the first side wall and second side wall which are opposite to each other is provided with a through hole for the sliding rod to pass through; the sliding rod between the second side wall and the first linkage member is sleeved with an elastic buffer member;

the second linkage member is of a U-shaped structure which is formed by sequentially connecting a fourth linkage wall, a sixth linkage wall and a fifth linkage wall; each of the fourth linkage wall and the fifth linkage wall which are opposite to each other is provided with a through hole for the sliding rod to pass through; the second linkage groove is formed in the fourth linkage wall; the closing member is arranged inside the second linkage member, and is of a U-shaped structure which is formed by sequentially connecting a third side wall, a second connecting wall and a fourth side wall; each of the third side wall and the fourth side wall which are opposite to each other is provided with a through hole for the sliding rod to pass through; the opening member is located between the fourth linkage wall and the fifth linkage wall; and the sliding rod between the fourth side wall and the fourth linkage wall is sleeved with an elastic buffer member.

Further, the first linkage wall is provided with a connecting groove for connecting with the closing member; the first connecting wall passes through the connecting groove of the first linkage member, such that the second side wall of the closing member is located inside the first linkage member; the closing operation portion is arranged on the first side wall; the closing operation portion extends out of the first sliding groove and is formed by extending from a middle edge of the first side wall to the first sliding groove; the end of the closing operation portion is bent downward; and the opening operation portion is arranged on the third side wall; the opening operation portion is integrally formed by the third side wall; the opening operation portion is entirely in a form of a U-shaped body with an upward opening; and the U-shaped body has a long side wall for connecting with the third side wall and a short side wall for contacting with the handle of the circuit breaker.

Further, the gear set further comprises a control gear; a raised trigger table is arranged on the control gear; a plurality of position identification switches is arranged at intervals on a circumference coaxial with the control gear to cooperate with the trigger table; the plurality of position identification switches comprise an initial position identification switch, a closing position identification switch, and an opening position identification switch;

the motor drives the closing output gear and the control gear to rotate in the closing process; the closing output gear rotates in a closing direction, and the closing operation portion operates the handle of the circuit breaker to be closed through the closing transmission shaft; when the trigger table triggers the closing position identification switch, the motor rotates reversely; when the trigger table triggers the initial position identification switch, the closing operation portion returns to an initial position, and the motor stops rotating; and the motor drives the opening output gear and the control gear to rotate in the opening process; the opening output gear rotates in an opening direction, and the opening operation portion operates the handle of the circuit breaker to be opened through the opening transmission shaft; when the trigger table triggers the opening position identification switch, the motor rotates reversely; and when the trigger table triggers the initial position identification switch, the opening operation portion returns to the initial position, and the motor stops rotating.

According to the electric operating device for the circuit breaker of the present invention, the sliding rod for providing a motion trail for the driving member is installed in the housing, so that the driving member operates the circuit breaker to be closed and opened through the closing operation portion and the opening operation portion in the process of moving along the sliding rod. The electric operating device is arranged oppositely to the handle of the circuit breaker, which is conducive to operating handles of a multipole circuit breaker.

In addition, the handles of a plurality of circuit breakers can be operated by cooperating a moving device with the motion trail. The closing operation portion and the opening operation portion can be widened according to the number of the handles of the circuit breaker, so that one electric operating device can operate the handles of the multipole circuit breaker.

In addition, the driving member is provided with an open linkage groove, which can be rotated in and out when it cooperates with the transmission shaft of the opening and closing output gear, so as to reduce the malfunctions caused by the cooperation between the transmission shaft and the driving member in the opening and closing process. The driving member includes a closing driving member and an opening driving member, which are independent of each other and cooperate with the closing output gear and the opening output gear of the transmission mechanism to operate the handle of the circuit breaker to be closed and opened respectively. This structure can be arranged on the front of the handle of the circuit breaker, is suitable for installation in a cabinet with a limited lateral space, and also avoids tilting during the operation of the handle of the circuit breaker, causing the contact head of the circuit breaker to be out of sync. The opening and closing output gear of the transmission mechanism is an oval gear made of a metal material. The use of this non-circular gear can achieve a periodically changing transmission ratio, a compact structure and good rigidity and can ensure a relatively stable transmission, and the metal material is conducive to prolonging the service life. A plurality of circuit breakers is operated by installing the moving device on the housing and being displaced under the driving of the moving device.

DETAILED DESCRIPTION OF SOME EMBODIMENTS

Figure 1:
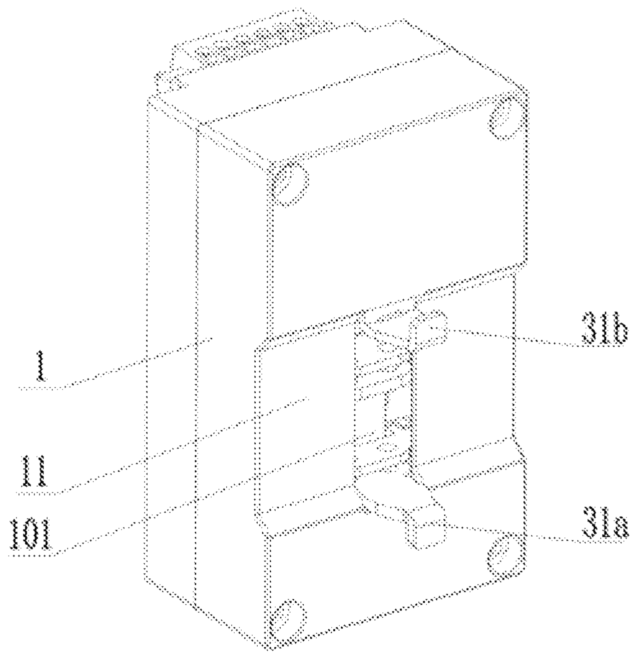
FIG. 1 is a schematic structural diagram of an electric operating device for a circuit breaker of the present invention.

The specific implementation of an electric operating device for a circuit breaker of the present invention will be further described below with reference to the embodiments given in FIGS. 1 to 20. The electric operating device for the circuit breaker of the present invention is not limited to the description of the following embodiments.

As shown in FIGS. 1 to 5, in the electric operating device for the circuit breaker, a side wall of a housing 1 serves as an operation surface 11 provided with a first sliding groove 101. The first sliding groove 101 is directly opposite to a handle 5 of the circuit breaker. A driving member for driving the handle 5 of the circuit breaker to be opened and closed is installed inside the housing 1. A sliding rod 102 is installed inside the housing 1. The driving member is installed on the sliding rod 102, and may extend out of the housing 1 from the first sliding groove 101 and move along the first sliding groove 101 under the operation of a transmission mechanism in the housing 1 to operate the handle 5 of the circuit breaker 5 to be opened or closed.

Figure 3:
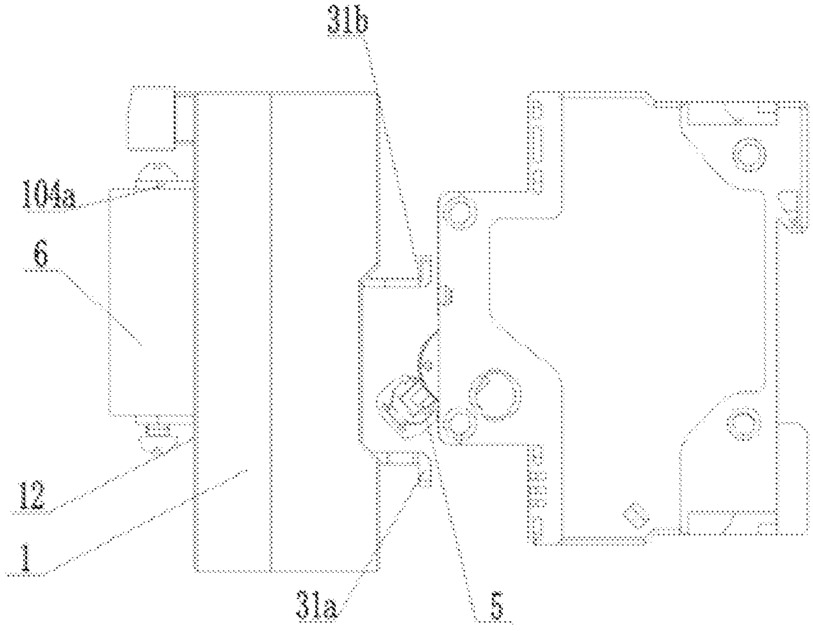
FIG. 3 is a schematic diagram of an initial state of the electric operating device for the circuit breaker of the present invention.
Figure 4:
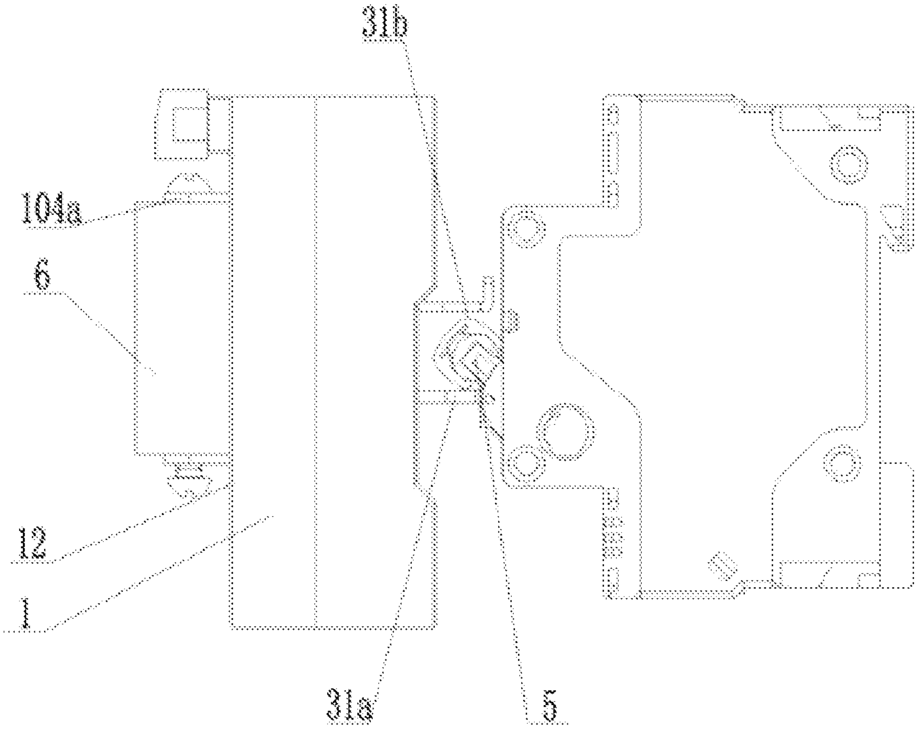
FIG. 4 is a schematic diagram when the electric operating device for the circuit breaker of the present invention is closed.
Figure 5:
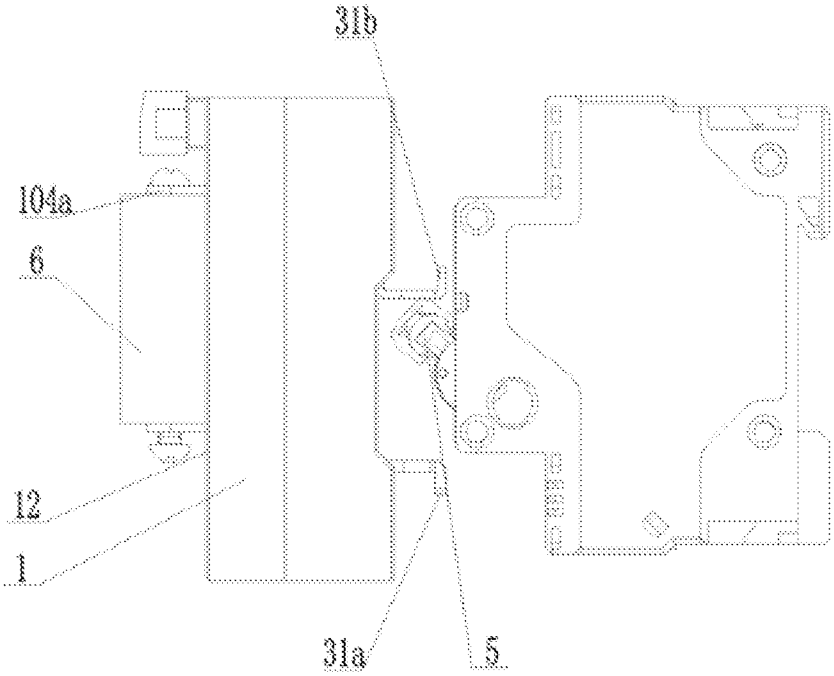
FIG. 5 is a schematic diagram when the electric operating device for the circuit breaker of the present invention is opened.

The driving member includes a closing operation portion 31*a* and an opening operation portion 31*b*. As shown in FIG. 3, in an initial state, a space is reserved between the closing operation portion 31*a* and the opening operation portion 31*b* of the driving member. The closing operation portion 31*a* is located below the opening operation portion 31*b*, and the handle 5 of the circuit breaker extends into this space. As shown in FIG. 4, when the circuit breaker needs to be closed, the transmission mechanism drives the closing operation portion 31*a* to move upward along the first sliding groove 101, and pushes the handle 5 of the circuit breaker to be closed upward. As shown in FIG. 5, when the circuit breaker needs to be opened, the transmission mechanism drives the opening operation portion 31*b* to move downward, and pushes the handle 5 of the circuit breaker to be opened downward. It should be pointed out that the arrangement in a vertical direction is relative. Obviously, the opening operation portion 31*b* may be located below the closing operation portion 31*a*, and the opening operation portion 31*b* moves upward to push the handle 5 of the circuit breaker to be opened. Preferably, in the initial state, that is, when the opening and closing operation is not performed, the closing operation portion 31*a* and the opening operation portion 31*b* may not contact the handle 5 of the circuit breaker, and can automatically return to the initial state and wait for the next command after the handle of the circuit breaker is driven by the closing driving member or the opening driving member to actuate. The space reserved between the closing driving member and the opening driving member makes the closing driving member and the opening driving member not in contact with the handle 5 in the initial state. If the closing driving member or the opening driving member can return to the initial state after driving the handle 5 to actuate, a damage of the circuit breaker caused by a malfunction of the closing driving member or the opening driving member is avoided. Specifically, when the closing driving member operates the handle 5 of the circuit breaker to return to the initial state after closing, the opening driving member operates the handle 5 of the circuit breaker to return to the initial state after opening, thereby preventing the closing driving member from interfering with the opening action of the opening driving member, and the opening driving member from interfering with the closing action of the closing driving member. In one implementation, a position identification switch is arranged in the transmission mechanism; and after the position identification switch is triggered, a control circuit controls the action of the transmission mechanism to operate the closing driving member or the opening driving member to return to the initial position.

The electric operating device arranged on the front of the handle 5 of the circuit breaker, instead of being traditionally arranged on the side wall of the circuit breaker, can be applied in a cabinet with a limited lateral space, and can also avoid a contact head of the circuit breaker from being out of sync caused by tilting during the operation of the handle 5 of the circuit breaker, or avoid the need to separately configure an electric operating device for each pole of the circuit breaker.

As an embodiment, the width of the closing operation portion 31*a* and the width of the opening operation portion 31*b* can be widened as required, and the handles 5 of the multipole circuit breaker are driven to actuate simultaneously.

Figure 2:
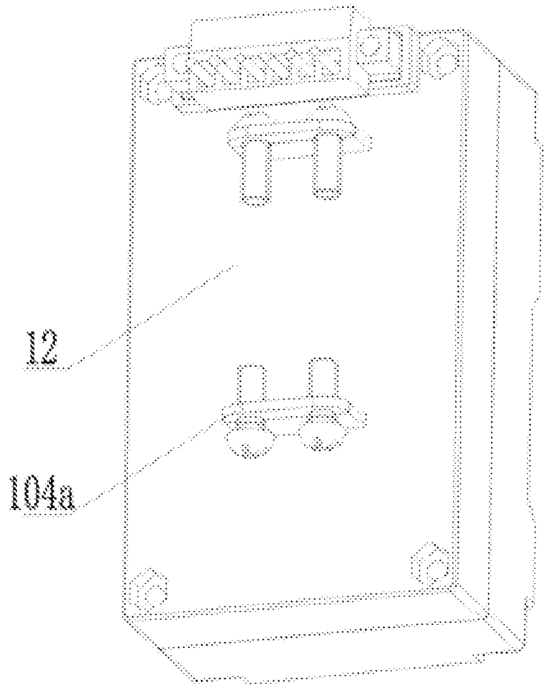
FIG. 2 is a schematic structural diagram of a connection surface of the electric operating device for the circuit breaker of the present invention.

Preferably, as an embodiment, as shown in FIG. 3, a moving device 6 is further arranged on the electric operating device. The moving device 6 for displacement is installed on the side wall as a connection surface 12 opposite to the operation surface 11, and the connection surface 12 is shown in FIG. 2. The electric operating device is installed on a motion trail (not shown) through the moving device 6. The moving device 6 can drive the electric operating device to move along the motion trail to respectively correspond to the handles 5 of different circuit breakers, so as to drive different circuit breakers to perform different closing and opening actions.

Figure 6:
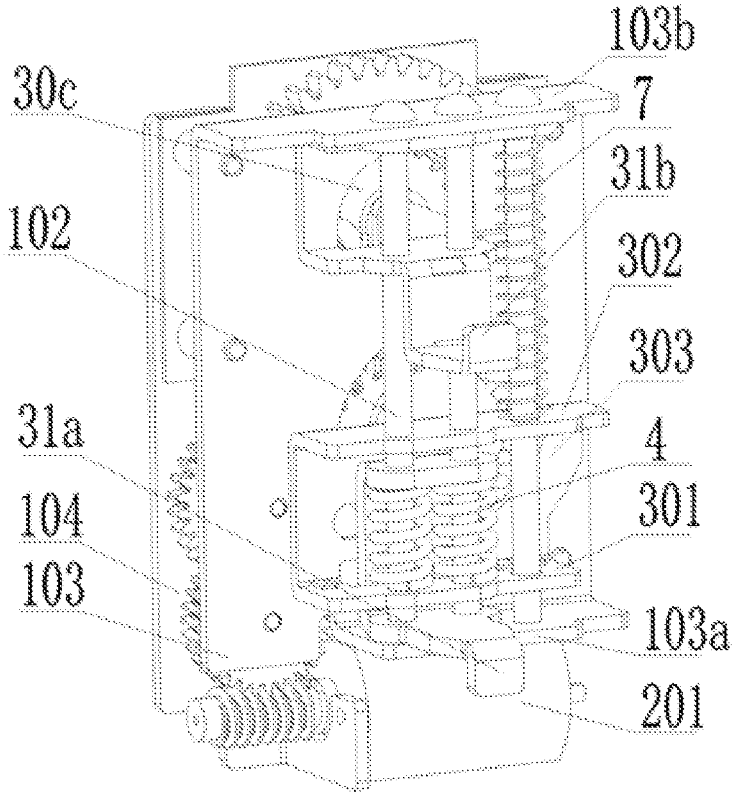
FIG. 6 is a schematic diagram (a split type) of an internal structure of the electric operating device for the circuit breaker of the present invention.
Figure 7:
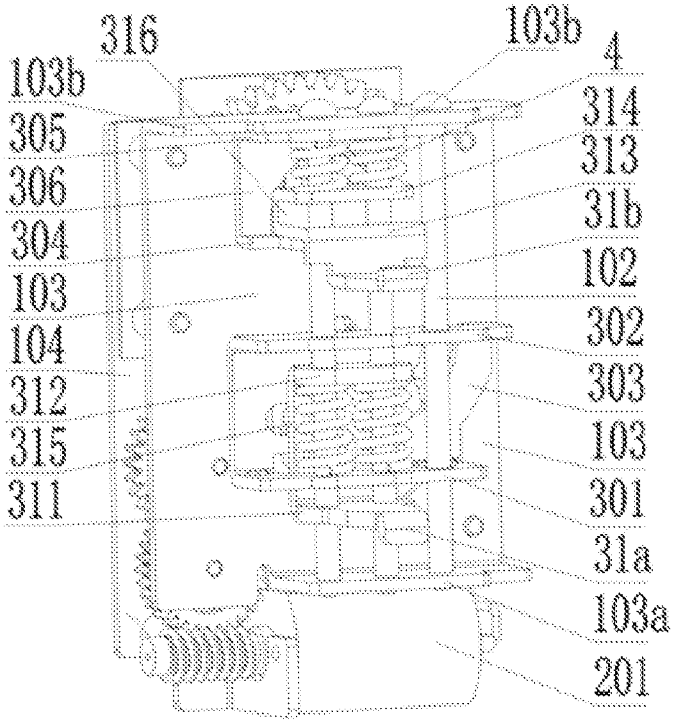
FIG. 7 is a schematic diagram (a split type) of an internal structure of the electric operating device for the circuit breaker of the present invention.

As an embodiment, as shown in FIG. 6 and FIG. 7, a support is arranged in the housing 1 of the electric operating device for the circuit breaker. The support divides the space in the housing 1 into a driving space and a transmission space. The support specifically includes a first support 103 and a second support 104 which are spaced from each other. The space between the first support 103 and the second support 104 is used as the transmission space allowing the transmission device to be installed. The space between the first support 103 and the operation surface 11 serves as the driving space allowing the driving member to be installed. Preferably, the sliding rod 102 is installed in the driving space. The driving member is slidably installed on the sliding rod 102 and operated by the transmission mechanism to move along the first sliding groove 101 on the sliding rod 102. The first support 103 and the second support 104 divide the space in the housing 1 into two relatively independent parts, which provide working areas for the transmission mechanism and the driving member, thereby avoiding unstable performances caused by mutual interference of various functional parts.

Preferably, the transmission mechanism includes a motor 201 and a gear set connected to the motor 201; the gear set includes an opening and closing output gear which is provided with a transmission shaft; the driving member is provided with a linkage groove cooperating with the transmission shaft; the motor 201 drives the gear set to rotate; and the driving member slides on the sliding rod 102 through the cooperation between the transmission shaft of the opening and closing output gear and the linkage groove of the driving member, so as to operate the handle 5 of the circuit breaker to be closed or opened. The gear set is installed in the transmission space between the first support 103 and the second support 104.

Preferably, a transmission ratio of the opening and closing output gear changes periodically to provide the driving member with a periodically changing driving force and action speed. The periodic transmission ratio of the opening and closing output gear provides a larger driving force for the driving member in the early stage of closing, and provides a larger closing speed for the driving member in the later stage of closing, thereby reducing the burnout of the contact head or the failure of the circuit breaker. As a preferred scheme, the opening and closing output gear is preferably an oval gear. In this way, an appropriate transmission force and lever ratio can be set, such that the driving member can obtain the periodically changing driving force and action speed during the closing and opening process, thereby avoiding the burnout of the contact head or the failure of the circuit breaker. A gear pair composed of such non-circular gears can realize a periodically changing transmission ratio, has a compact structure and good rigidity and can ensure a relatively stable transmission. Obviously, the opening and closing output gear may also be a circular gear, but cannot obtain a periodic transmission ratio.

Figure 10:
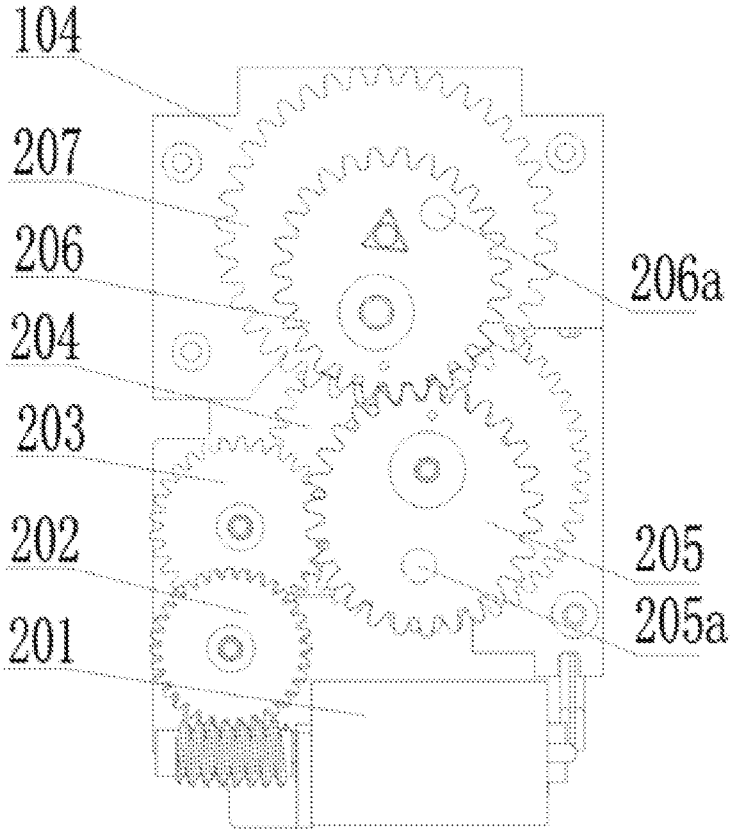
FIG. 10 is a schematic diagram (an initial state) of a transmission mechanism of the electric operating device for the circuit breaker of the present invention.
Figure 11:
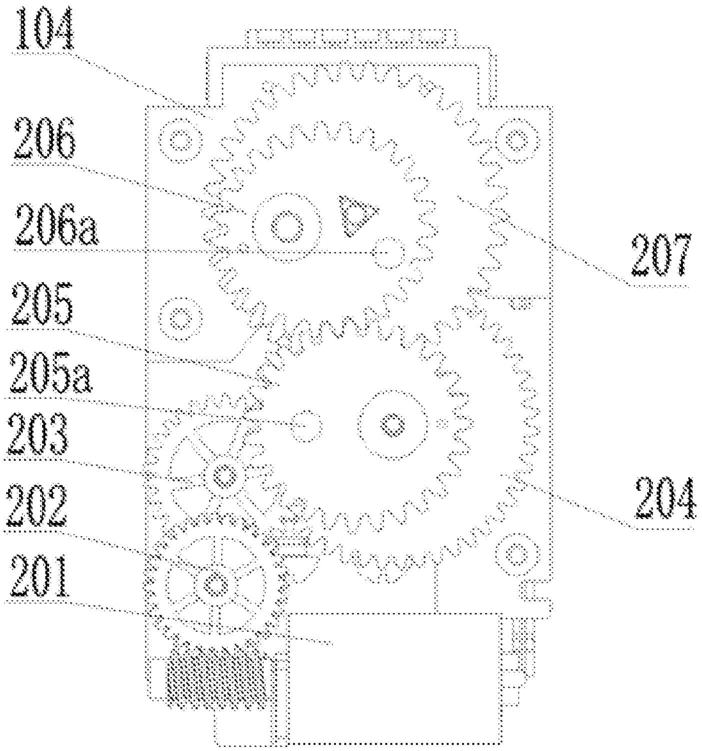
FIG. 11 is a schematic diagram (a closed state) of the transmission mechanism of the electric operating device for the circuit breaker of the present invention.

In the embodiment shown in FIG. 10 and FIG. 11, the opening and closing output gear includes a closing output gear 205 and an opening output gear 206. The transmission shaft on the opening and closing output gear includes a closing transmission shaft 205*a* arranged on the closing output gear 205 and an opening transmission shaft 206*a* arranged on the opening output gear 206. The closing transmission shaft 205*a* is used to operate the closing operation portion 31*a* of the driving member to close the handle 5 of the circuit breaker, and the opening transmission shaft 206*a* is used to operate the opening operation portion 31*b* of the driving member to open the handle 5 of the circuit breaker. Preferably, the closing output gear 205 and the opening output gear 206 are meshed with each other, and can be driven and controlled at the same time.

The closing output gear 205 and the opening output gear 206 are preferably oval gears made of a metal material, wherein a pitch curve of the oval gear is an oval or a higher-order oval. Since the size of a central angle corresponding to each tooth of the oval gear is not always equal, the closing output gear 205 and the opening output gear 206 rotate at a non-uniform speed during the meshing rotation process, and this non-uniform rotation presents a periodic speed change. According to this characteristic, the appropriate transmission force and lever ratio are designed, so that the closing operation portion 31*a* can obtain a larger closing driving force in the early stage of closing, and obtain a faster closing speed in the later stage of closing. In the early stage of closing, that is, a period from the beginning of closing to the time of being about to close, an oval long side of the opening output gear 206 is in contact and cooperation with an oval short side of the closing output gear 205, such that the closing operation portion 31*a* obtains a larger closing driving force; and in the late stage of closing, that is, a period from the time of being about to close to the time at which closing is completed, an oval short side of the opening output gear 206 is in contact and cooperation with an oval long side of the closing output gear 205, such that the closing operation portion 31*a* obtains a faster closing speed. During the rotation process, a fixed center distance ensures that the closing output gear 205 and the opening output gear 206 maintain good meshing at all times. At the same time, the transmission force and a lever cooperate with the action process of the circuit breaker, so that the instant closing action is fast, that is, the closing force in the early stage of closing is increased at the instant when a moving contact head contacts a static contact head. A gear pair composed of such non-circular gears is adopted as the closing output gear 205 and the opening output gear 206, which can realize the periodically changing transmission ratio, has a compact structure and good rigidity and can ensure a relatively stable transmission; and the oval gears made of the metal material is conducive to prolonging the service life. Obviously, the opening output gear 205 and the closing output gear 206 may also be circular gears, but cannot obtain a periodic transmission ratio.

Figure 8:
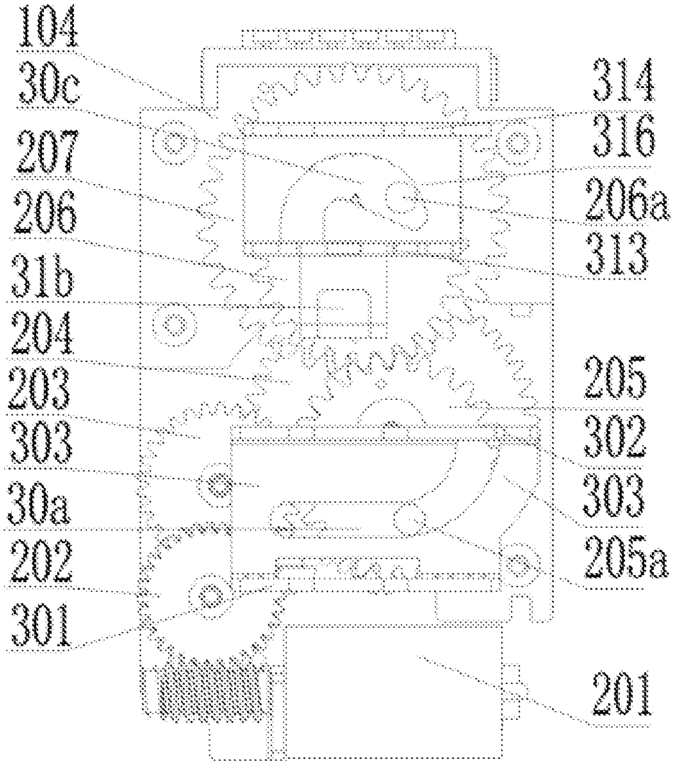
FIG. 8 is a schematic diagram (a split type, not including a first support) of the internal structure of the electric operating device for the circuit breaker of the present invention.

Specifically, the gear set further includes a first-stage gear 202, a second-stage gear 203 and a third-stage gear 204. The motor 201 is meshed with the first-stage gear 202 through a worm, the first-stage gear 202 is meshed with the second-stage gear 203, the second-stage gear 203 is meshed with the third-stage gear 204, and the opening and closing output gear is installed on the third-stage gear 204. As shown in FIGS. 8, 10 and 11, the three-stage gear 204 is provided with a closing output gear 205 and an opening output gear 206, which are meshed with each other. The closing output gear 205 and the third-stage gear 204 are driven by the same rotating shaft. The rotating shaft of the closing output gear 205 is eccentrically arranged, that is, the rotating shaft of the closing output gear 205 is not arranged in the center of the closing output gear 205. The opening output gear 206 is meshed with the closing output gear 205. The rotating shaft of the opening output gear 206 is eccentrically arranged, that is, the rotating shaft of the opening output gear 206 is not arranged in the center of the opening output gear 206. A closing transmission shaft 205*a* is arranged on the closing output gear 205, and an opening transmission shaft 206*a* is arranged on the opening output gear 206. The eccentric arrangement makes rotation centers of the two oval gears spaced by a certain distance. Of course, the third-stage gear 204 and the opening output gear 206 may also be driven by the same rotating shaft, and the opening output gear 206 drives the closing output gear 205 to rotate.

Figure 21:
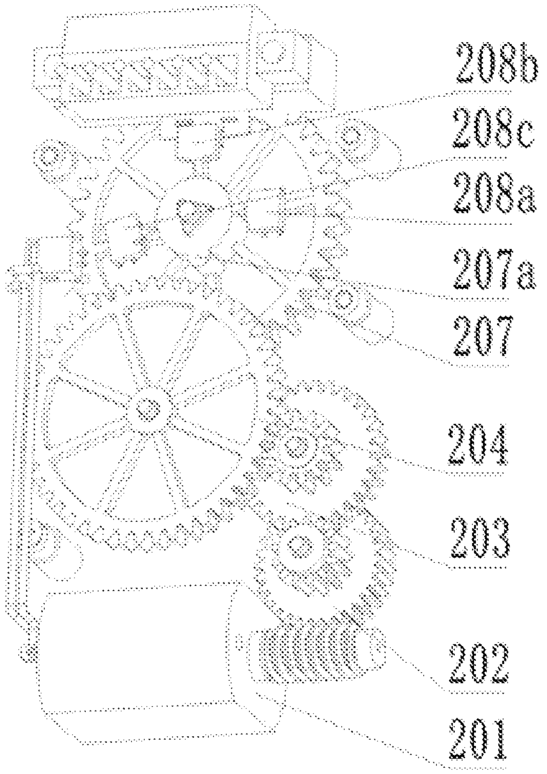
FIG. 21 is a schematic structural diagram (close to one side of the second support) of a control gear of the electric operating device for the circuit breaker of the present invention.
Figure 22:
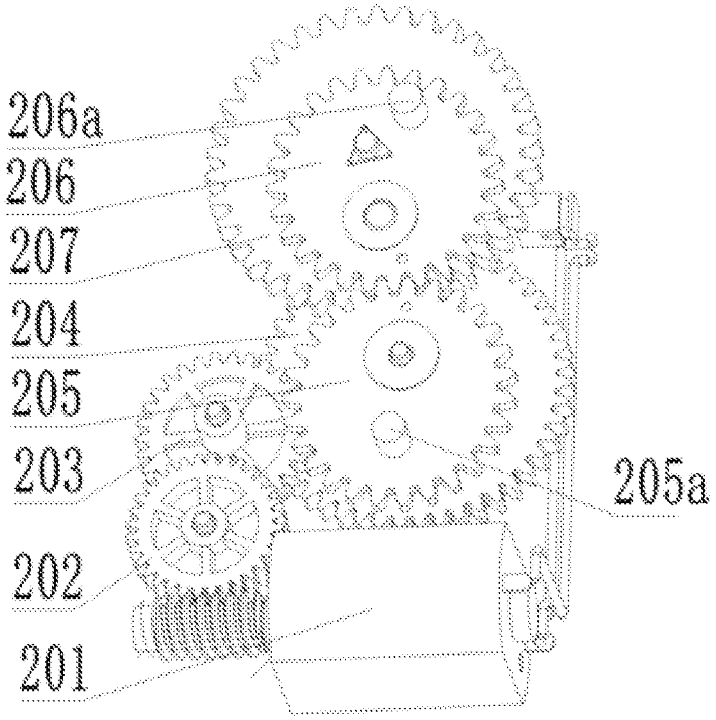
FIG. 22 is a schematic structural diagram (close to one side of the first support) of the control gear of the electric operating device for the circuit breaker of the present invention.

As shown in FIGS. 21 and 22, the transmission mechanism further includes a control gear 207 and a plurality of position identification switches. A raised trigger table 207*a* is arranged on the control gear 207. The plurality of position identification switches is fixedly installed in the housing 1 and arranged at intervals on a circumference coaxial with the control gear 207, preferably on one side close to the second support 104 (see FIGS. 6 and 7 for the second support 104). The plurality of position identification switches is respectively used to provide position signals in cooperation with the trigger table 207*a*, and thus to control the forward rotation, reverse rotation and rotation stop of the motor. The plurality of position identification switches includes an initial position identification switch 208*a*, a closing position identification switch 208*b* and an opening position identification switch 208*c*. The control gear 207 and the opening output gear 206 are installed on the same rotating shaft, and the opening output gear 206 rotates to drive the control gear 207 to rotate. The motor 201 sequentially drives the closing output gear 205, the opening output gear 206 and the control gear 207 to rotate.

The closing process is as follows: when the motor 201 drives the closing output gear 205 to rotate in the closing direction under the transmission of the first-stage gear 202, the second-stage gear 203 and the third-stage gear 204, taking the counterclockwise rotation of the closing output gear as an example (see the direction in FIG. 22), the opening output gear 206, the control gear 207 and the trigger table 207*a* all rotate clockwise (see FIG. 21 for the direction of counterclockwise rotation) at this time. The trigger table 207*a* rotates from the initial position identification switch 208*a* to the closing position identification switch 208*b*, and the closing output gear 205 enables the closing operation portion 31*a* of the closing driving member to operate the handle 5 of the circuit breaker to be closed through the closing transmission shaft 205*a*; when the trigger table 207*a* triggers the closing position identification switch 208*b*, the motor 201 is controlled to rotate reversely in an opening direction; and when the trigger board 207*a* triggers the initial position identification switch 208*a*, the closing operation portion 31*a* is controlled to return to the initial position, and the motor 201 stops rotating.

The opening process is as follows: when the motor 201 drives the closing output gear 205 to rotate in the opening direction under the transmission of the first-stage gear 202, the second-stage gear 203 and the third-stage gear 204, taking the clockwise rotation of the closing output gear 205 as an example (see the direction in FIG. 22), the opening output gear 206, the control gear 207 and the trigger table 207*a* all rotate counterclockwise at this time (see FIG. 21 for the direction of clockwise rotation). The trigger table 207*a* rotates from the initial position identification switch 208*a* to the opening position identification switch 208*c*, and the opening output gear 206 rotates in the opening direction and enables the opening operation portion 31*b* to operate the handle 5 of the circuit breaker to be opened through the opening transmission shaft 206*a*; when the trigger table 207*a* triggers the opening position identification switch 208*c*, the motor 201 is controlled to rotate reversely in the closing direction; and when the trigger board 207*a* triggers the initial position identification switch 208*a*, the opening operation portion 31*a* is controlled to return to the initial position.

According to the present invention, in-position signals for closing, opening and initial positions are provided by the plurality of position identification switches to control the forward and reverse rotation of the motor. The position identification switches and the control motor 201 may be respectively connected to a control circuit. The control circuit can be realized by a circuit, or by a single-chip microcomputer. The control circuit may be arranged in the housing 1 or outside the housing 1, and can be controlled in a remote manner.

As an implementation, a transmission shaft is arranged on the transmission mechanism, and the driving member includes a closing driving member and an opening driving member. The closing driving member and the opening driving member are respectively provided with a closing operation portion 31*a* and an opening operation portion 31*b*. The closing driving member and the opening driving member are respectively provided with a linkage groove, and the linkage grooves of the closing driving member and the opening driving member are provided with openings in opposite directions for periodic cooperation with and separation from the transmission shaft of the transmission mechanism. Preferably, the driving member includes a linkage member connected to the transmission mechanism, and the linkage groove formed in the linkage member is used for connecting with the transmission shaft.

The linkage groove of the driving member can convert a circular motion of the opening and closing output gear into a linear motion. Under the cooperation of the linkage groove and the transmission shaft, the driving member moves linearly in the first sliding groove 101. The closing operation portion 31*a* and the opening operation portion 31*b* of the driving member respectively operate the handle 5 of the circuit breaker to be closed and opened. The linear motion of the driving member is preferably carried out along the sliding rod 102. Specifically, as shown in FIG. 8, the linkage groove of the closing driving member is the first linkage groove 30*a*, and the linkage groove of the opening driving member is the second linkage groove 30*c*. When the transmission shaft cooperates with the first linkage groove 30*a* on the closing driving member, the transmission shaft is separated from the second linkage groove 30*c* of the opening driving member to prevent the opening driving member from malfunctioning; and when the transmission shaft cooperates with the second linkage groove 30*c* of the opening driving member, the transmission shaft is separated from the first linkage groove 30*a* of the closing driving member to prevent the closing driving member from malfunctioning.

Figure 13:
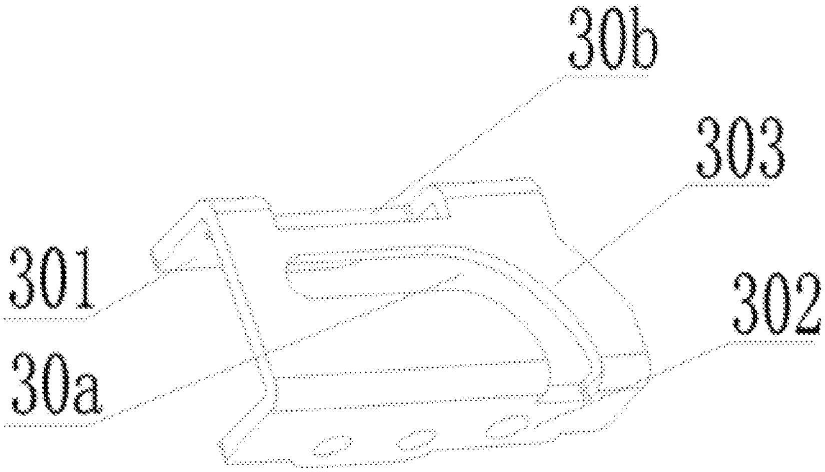
FIG. 13 is a schematic diagram of a first linkage member of the electric operating device for the circuit breaker of the present invention.
Figure 15:
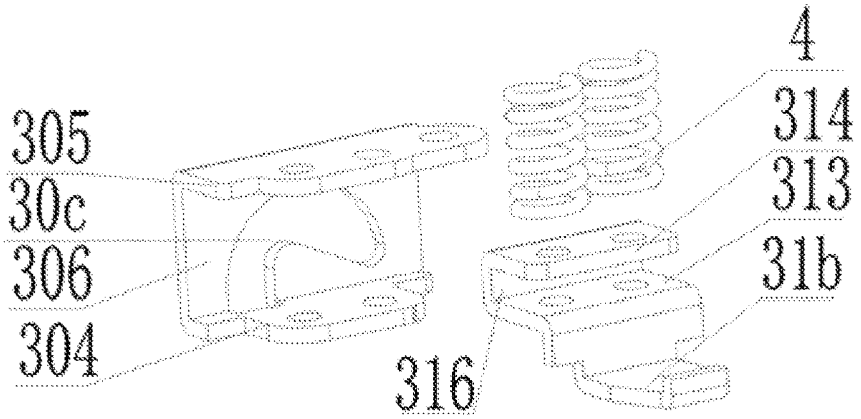
FIG. 15 is a schematically exploded view of FIG. 14.

Specifically, as shown in FIGS. 8, 13 and 15, the transmission shaft includes a closing transmission shaft 205*a* and an opening transmission shaft 206*a*. Each of the first linkage groove 30*a* and the second linkage groove 30*c* includes an open end and a closed end; the closed end of the first linkage groove 30*a* cooperates with the closing transmission shaft 205*a* to drive the first linkage member to move; the open end of the first linkage groove 30*a* is used to enable the closing transmission shaft 205*a* to be rotated out after the closing is completed, thereby realizing the separation from the first linkage member, thereby preventing the closing operation portion 31*a* from malfunctioning in the opening process; in the same way, the closed end of the second linkage groove 30*c* cooperates with the opening transmission shaft 206*a* to drive the second linkage member to move; and the open end of the second linkage member is used to enable the opening transmission shaft 206*a* to be rotated out after the opening is completed, thereby realizing the separation from the second linkage member, thereby preventing the opening operation portion 31*b* from malfunctioning in the closing process.

Specifically, as shown in FIGS. 7 and 8, the driving member includes a linkage member and an operation member driven by the linkage member, wherein the transmission mechanism is connected to the linkage member, the linkage member is installed on the sliding rod 102, the operating member is in linkage with the linkage member, the linkage groove formed in the linkage member is used for connecting with the transmission shaft, and the closing operation portion 31*a* and the opening operation portion 31*b* are arranged on the operation member. The linkage member specifically includes a first linkage member and a second linkage member, wherein the first linkage member is provided with a first linkage groove 30*a* that periodically cooperates with the closing transmission shaft 205*a*, and the second linkage member is provided with a second linkage groove 30*c* that periodically cooperates with the opening transmission shaft 206*a*; and the operation member includes a closing member provided with the closing operation portion 31*a* and an opening member provided with the opening operation portion 31*b*. Preferably, an elastic buffer member 4 is arranged between the linkage member and the operation member. The elastic buffer member 4 is used to absorb opening and closing margins and prevent a hard shock of the closing operation portion 31*a* and the opening operation portion 31*b* on the handle 5, such that the handle 5 cannot be pushed in place accurately or even broken. Of course, the elastic buffer member 4 may not be provided at all, or may be provided only on the closing driving member, and may be omitted from the opening driving member.

Figure 12:
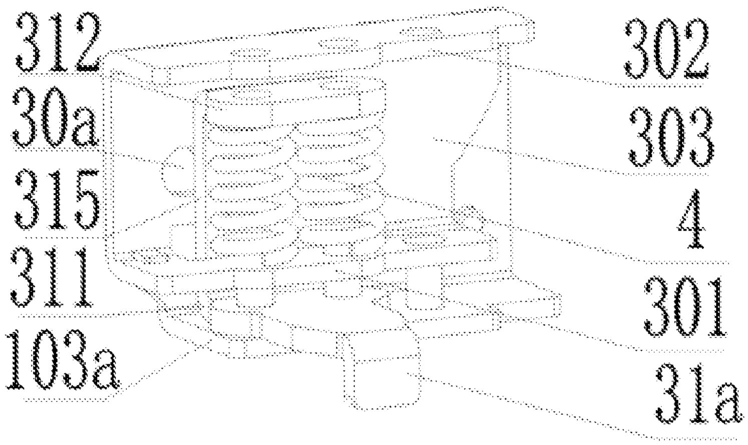
FIG. 12 is a schematic diagram of a closing driving member of the electric operating device for the circuit breaker of the present invention.
Figure 14:
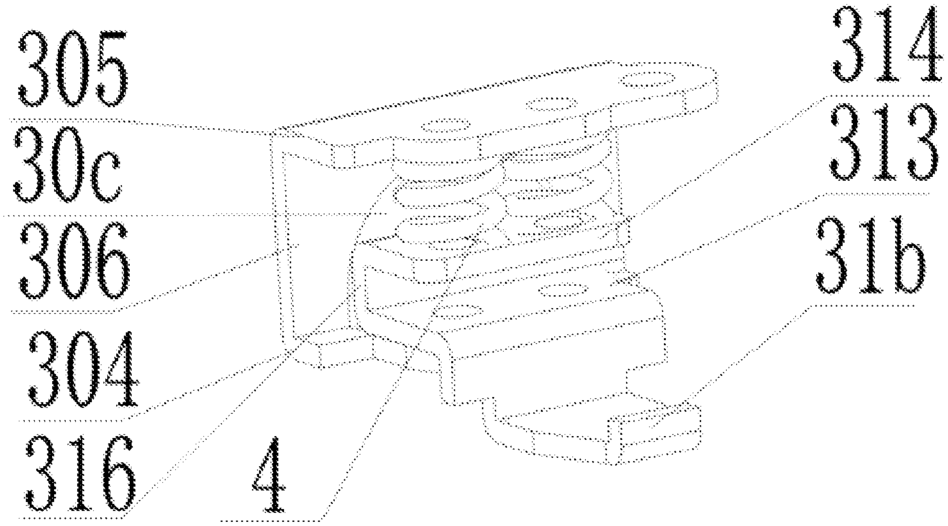
FIG. 14 is a schematic diagram of an opening driving member of the electric operating device for the circuit breaker of the present invention.

Specifically, as shown in FIGS. 12 and 14, the driving member includes a closing driving member provided with a closing operation portion 31*a* and an opening driving member provided with an opening operation portion 31*b*, wherein the closing member and the opening member are operation members driven by the linkage member. Specifically, the closing driving member includes a first linkage member and a closing member, wherein the first linkage member is installed on the sliding rod 102, the closing member is installed on the sliding rod 102 and is in linkage with the first linkage member, and the first linkage member is provided with a first linkage groove 30*a* cooperating with the closing transmission shaft 205*a*; a closing operation portion 31*a* for operating the handle 5 of the circuit breaker is arranged on the closing member; and an elastic buffer member 4 is preferably arranged between the first linkage member and the closing member. The opening driving member includes a second linkage member and an opening member, wherein the second linkage member is installed on the sliding rod 102, the opening member is installed on the sliding rod 102 and is in linkage with the second linkage member, and the second linkage member is provided with a second linkage groove 30*c* cooperating with the opening transmission shaft 206*a*; an opening operation portion 31*b* for operating the handle 5 of the circuit breaker is arranged on the opening member; and an elastic buffer member 4 is preferably arranged between the second linkage member and the opening member.

The closing driving member and the opening driving member are arranged independently of each other, and are respectively driven by the transmission mechanism to operate the handle 5 of the circuit breaker to be closed and opened. As shown in FIG. 6, a compression spring 7 is arranged between the closing driving member and the opening driving member. The compression spring 7 is used to assist in cooperating the reset of the closing driving member and the opening driving member, and can also reduce the effect of a gap when the closing driving member and the opening driving member cooperate with each other. The linear motion of the closing driving member during the closing process makes the compression spring 7 deform and store energy. When the closing is completed, an elastic force of the compression spring 7 provides an auxiliary driving force for the closing driving member to return to the initial position. In the same way, a linear motion of the opening driving member during the opening process makes the compression spring 7 deform and store energy, and the elastic force of the compression spring 7 provides an auxiliary driving force for the opening driving member to return to the initial position. Preferably, the sliding rod 102 between the closing driving member and the opening driving member is sleeved with the compression spring 7, which can be used as the compression spring 7 and can also provide a driving force for the reset of the first linkage member and the second linkage member, thereby ensuring a reset speed.

As shown in FIG. 13, the first linkage member is of a U-shaped structure which is formed by sequentially connecting a first linkage wall 301, a third linkage wall 303 and a second linkage wall 302 and has an opening facing the first sliding groove 101; each of the first linkage wall 301 and the second linkage wall 302 which are opposite to each other is provided with a through hole for the sliding rod 102 to pass through; the first linkage wall 301 is provided with a connecting groove 30*b* for connecting with the closing member; the third linkage wall 303 is provided with a first linkage groove 30*a* which has an approximately equal inner diameter; the first linkage groove 30*a* has a closed end and an open end; the first linkage groove 30*a* includes a first straight segment and a first circular arc segment that communicate with each other; the first straight segment is perpendicular to the sliding rod 102; the first circular arc segment is in a shape of a quarter circular arc; the closed end is located at the end of the first straight segment; the first straight segment is parallel to the first linkage wall 301; and the open end is located at the end of the first circular arc segment, and has an opening arranged at the connection between the second linkage wall 302 and the third linkage wall 303. When the motor 201 rotates to drive the closing output gear 205 of the transmission mechanism to rotate in the closing direction, the closing transmission shaft 205*a* rotates from the open end of the first linkage groove 30*a* into the first linkage groove 30*a* and rotates along the first linkage groove 30*a*.

As shown in FIG. 12, the closing member is preferably smaller than the first linkage member and is arranged inside the first linkage member. The closing member is of a U-shaped structure which is formed by sequentially connecting a first side wall 311, a first connecting wall 315 and a second side wall 312; each of the first side wall 311 and the second side wall 312 is provided with a through hole for the sliding rod 102 to pass through; the first connecting wall 315 passes through the connecting groove 30*b* of the first linkage member, such that the second side wall 312 of the closing member is located inside the first linkage member; the sliding rod 102 between the second side wall 312 and the first linkage member is sleeved with an elastic buffer member 4; the first side wall 311 or the second side wall 312 is provided with a closing operation portion 31*a* for operating the handle 5 of the circuit breaker to be closed; and the closing operation portion 31*a* extends out of the first sliding groove 101 and is preferably formed by extending from a middle edge of the first side wall 311 toward the first sliding groove 101, and the end of the closing operation portion 31*a* is bent downward.

As shown in FIG. 15, the second linkage member is of a U-shaped structure which is formed by sequentially connecting a fourth linkage wall 304, a sixth linkage wall 306 and a fifth linkage wall 305; each of the fourth linkage wall 304 and the fifth linkage wall 305 which are opposite to each other is provided with a through hole for the sliding rod 102 to pass through; the sixth linkage wall 306 is provided with an arc-shaped second linkage groove 30*c*; and the opening transmission shaft 206*a* extends into the second linkage groove 30*c* to drive the second linkage member to move. The second linkage groove 30*c* includes a second straight segment and a second circular arc segment that are communicated in sequence, wherein the second straight segment is parallel to the sliding rod 102; the second circular arc segment is close to a semi-circular arc shape; the closed end is located at the end of the second circular arc segment; one side of the second circular arc segment is a circular arc side wall, and the other side thereof is a straight side wall; and an open end is located at the end of the second straight segment, and has an opening arranged at the connection between the fourth linkage wall 304 and the sixth linkage wall 306. When the opening transmission shaft 206*a* rotates in from the open end, moves to the closed end along the circular arc side wall and drives the second linkage member to move, and then rotates out along the straight side wall to be separated from the second linkage member, preventing a malfunction during the closing process.

The opening member is arranged in the second linkage member, and is of a U-shaped structure formed by sequentially connecting a third side wall 313, a second connecting wall 316 and a fourth side wall 314; each of the third side wall 313 and the fourth side wall 314 which are opposite to each other is provided with a through hole for the sliding rod 102 to pass through; and the third side wall 313 or the fourth side wall 314 is provided with an opening operation portion 31*b* for operating the handle 5 of the circuit breaker to be opened. Preferably, the opening operation part 31*b* is integrally formed by the third side wall 313. The opening operation portion 31*b* is entirely in a form of a U-shaped body with an upward opening; and the U-shaped body has a long side wall for connecting with the third side wall 313 and a short side wall for contacting with the handle 5 of the circuit breaker. The opening member is located between the fourth linkage wall 304 and the fifth linkage wall 305, and the sliding rod 102 between the fourth side wall 314 and the fourth linkage wall 304 is sleeved with an elastic buffer member 4. The elastic buffer member 4 is preferably a spring.

Figure 16:
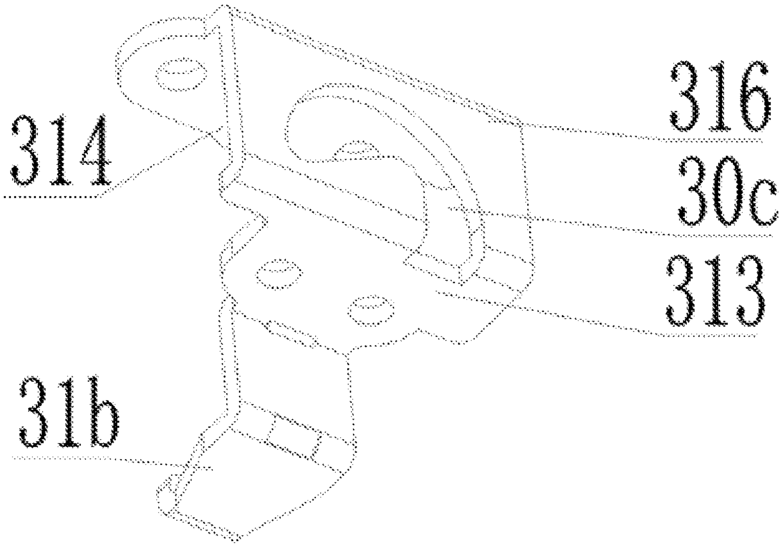
FIG. 16 is a schematic diagram (with a second linkage groove) of an opening member of the electric operating device for the circuit breaker of the present invention.

Preferably, as an embodiment shown in FIGS. 6 and 16, the second linkage groove 30*c* may be formed in the second connecting wall 315 of the opening member, without a linkage member. The opening transmission shaft 206*a* drives the opening member to move linearly in the first sliding groove 101 through the second linkage groove 30*c*. At this time, the opening at the open end of the second linkage groove 30*c* is provided at the connection between the third side wall 313 and the second connecting wall 316, such that the second linkage member and the elastic buffer member 4 arranged between the second linkage member and the opening member can be omitted. The opening member in FIG. 6 is shown such that the second linkage member and the elastic buffer member 4 are omitted.

It should be pointed out that the closing output gear 205 and the opening output gear 206 are meshed with each other and thus have opposite rotation directions. Therefore, the opening directions of the open end of the first linkage groove 30*a* and the open end of the second linkage groove 30*c* are staggered, and the closed ends thereof are staggered. A direction from the open end to the closed end of the first linkage groove 30*a* is opposite to a direction from the open end to the closed end of the second linkage groove 30*c*, and the first linkage groove 30*a* has a rotation direction opposite to that of the second linkage groove 30*c*. As shown in FIG. 8, the closed end of the first linkage groove 30*a* is located on the left side of the first linkage member, and the closed end of the second linkage groove 30*c* is located on the right side of the second linkage member. The open end of the first linkage groove 30*a* is located at the upper right of the first linkage member, and the open end of the second linkage groove 30*c* is located at the lower left of the second linkage member.

In this embodiment shown in FIGS. 17 to 20, the closing operation portion 31*a* and the opening operation portion 31*b* are of an integrated structure by using one linkage member and one operation member. The driving member includes a linkage member and an operation member, wherein the linkage member cooperates with the transmission mechanism and is installed on the sliding rod 102, the operation member is installed on the sliding rod 102 and is in linkage with the linkage member, and an elastic buffer member 4 is arranged between the linkage member and the operation member. The linkage member is provided with a linkage groove 3*a*. The operation member includes a closing operation portion 31*a* and an opening operation portion 31*b* which are connected together. The opening and closing output gear of the transmission mechanism is provided with a transmission shaft. The transmission shaft cooperates with the linkage groove 3*a* to drive the driving member to move linearly along the sliding rod 102. The closing operation portion of the operation member is used to operate the handle 5 of the circuit breaker to be closed, and the opening operation portion is used to operate the handle 5 of the circuit breaker to be opened.

In this embodiment, the transmission mechanism only needs to be provided with one opening and closing output gear, without the need to be provided with the closing output gear 205 and the opening output gear 206 separately. An opening and closing transmission shaft is arranged on the opening and closing output gear. A circular gear may be used as the opening and closing output gear. The opening and closing transmission shaft is connected to the linkage groove 3*a* of the linkage member. The handle 5 of the circuit breaker is closed by operating the closing operation portion 31*a*, and the handle 5 of the circuit breaker is opened by operating the opening operation portion 31*b*.

Figure 17:
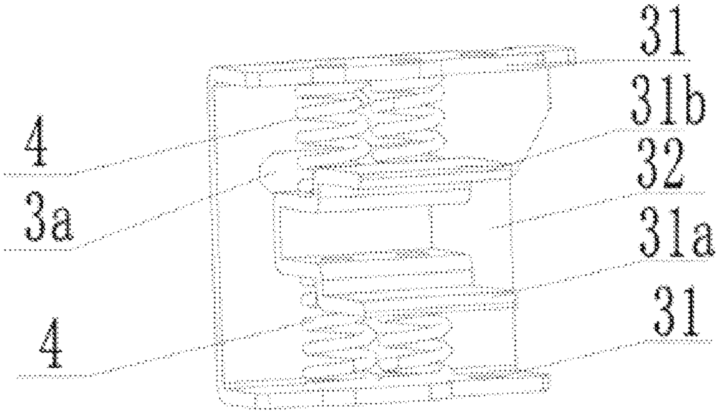
FIG. 17 is a schematic diagram (an integral type) of a driving member of the electric operating device for the circuit breaker of the present invention.
Figure 18:
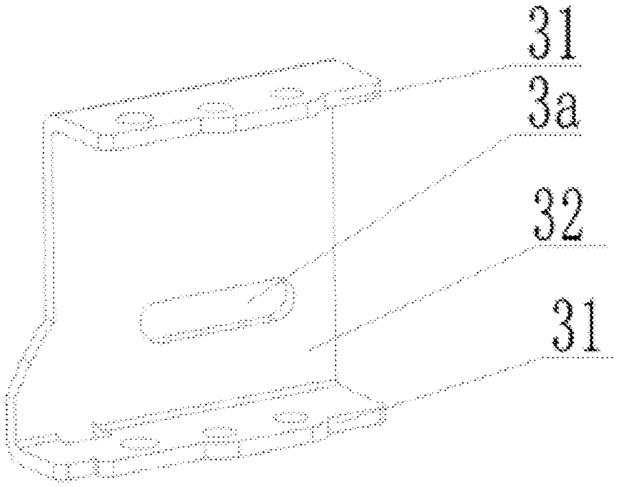
FIG. 18 is a schematic diagram (an integral type) of a linkage member of the electric operating device for the circuit breaker of the present invention.

As shown in FIGS. 17 and 18, the linkage member is of a U-shaped structure which is formed by connecting two transverse linkage walls 31 and a vertical linkage wall 32 and has an opening facing the first sliding groove 101. The two transverse linkage walls 31 are provided with through holes for the sliding rod 102 to pass through. The vertical linkage wall 32 is provided with a linkage groove 3*a*. The linkage groove 3*a* cooperates with the transmission mechanism, such that the linkage member drives the driving member to move along the sliding rod 102 to operate the handle 5 of the circuit breaker to be opened or closed. Preferably, the linkage groove 3*a* formed in the vertical linkage wall 32 is a bar-shaped linkage groove 3*a* with two closed ends. A central axis of the linkage groove 3*a* is perpendicular to the sliding rod 102. The opening and closing transmission shaft extends into the linkage groove 3*a* to drive the linkage member to move linearly along the sliding rod.

Figure 19:
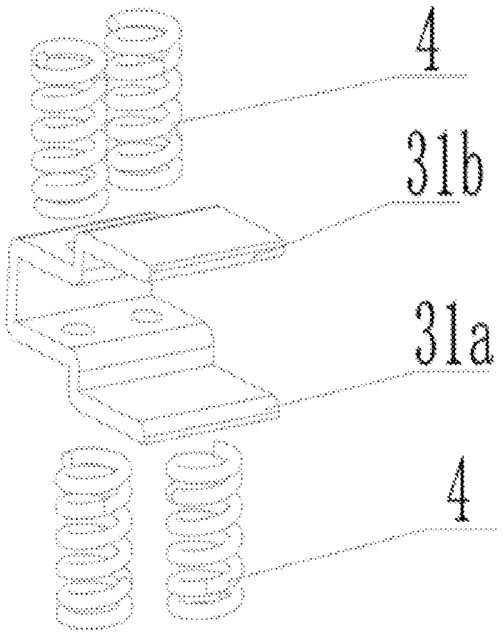
FIG. 19 is a schematic diagram of an operation member and a buffer member of the electric operating device for the circuit breaker of the present invention.
Figure 20:
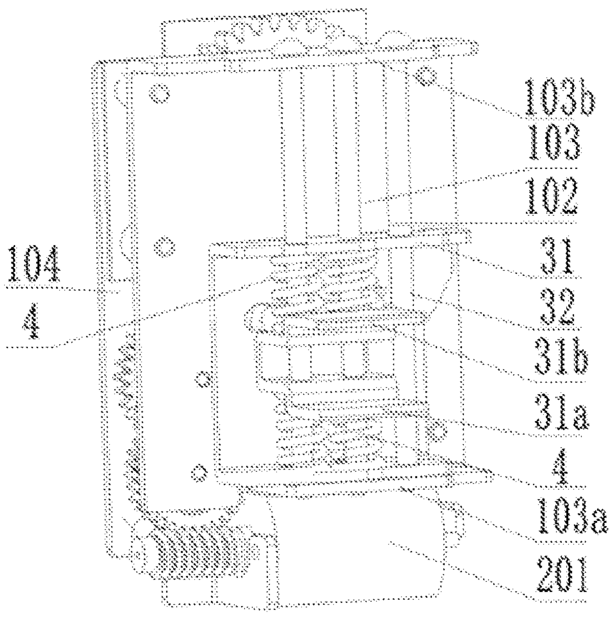
FIG. 20 is a schematic installation diagram (an integral type) of the driving member of the electric operating device for the circuit breaker of the present invention.

In one embodiment shown in FIG. 19, the operation member is arranged inside the linkage member and extends out of the first sliding groove 101 to operate the handle 5 of the circuit breaker. The operation member includes a closing side wall and an opening side wall, wherein the closing side wall and the opening side wall are connected to form a U-shaped structure with an opening facing the first sliding groove 101. Each of the closing side wall and the opening side wall is provided with a through hole for the sliding rod 102 to pass through. The sliding rod 102 between the closing side wall and one transverse linkage wall 31 is sleeved with an elastic buffer member 4, and the edge of the closing side wall serves as the closing operation portion 31*a*. The sliding rod 102 between the opening side wall and the other transverse linkage wall 31 is sleeved with an elastic buffer member 4, and the edge of the opening side wall serves as the opening operation portion 31*b*. In order to save the space, the distance between the closing operation portion 31*a* and the opening operation portion 31*b* is increased, and the closing side wall and the opening side wall are preferably stepped. In this way, the closing side wall and the opening side wall are connected to form a symmetrical U-shaped structure with a gradually enlarged opening. The through holes formed in the closing side wall and the opening side wall for the sliding rod 102 to pass through are formed in one side close to the linkage member.

The driving member in the present invention may be an opening driving member and a closing driving member which are arranged separately to form a split type, or an integral driving member. In this way, the type of the driving member may be designed according to the needs of the handle of the circuit breaker, such that the electric operating device for the circuit breaker of the present invention has wide applicability.

In order to optimally distinguish the space in the housing 1, it is preferable to divide the space in the housing 1 into the driving space and the transmission space for accommodating the first support 103 and the second support 104. Preferably, as shown in FIGS. 6 and 7, a first locking portion 103*a* and a second locking portion 103*b* are arranged at the lower end and the upper end of the first support 103 respectively. The first locking portion 103*a* and the second locking portion 103*b* are formed by bending the lower end and the upper end of the first support 103 toward the operation surface 11, respectively. The area between the first locking portion 103*a* and the second locking portion 103*b* serves as an installation area allowing the sliding rod 102 to be installed.

Figure 9:
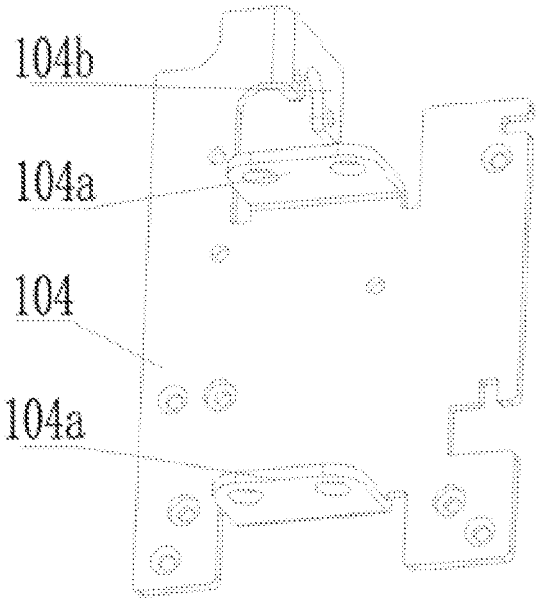
FIG. 9 is a schematic structural diagram of a second support of the electric operating device for the circuit breaker of the present invention.

As shown in FIG. 9, the second support 104 is provided with connection lugs 104*a* allowing the moving device 6 to be installed. Two connection lugs 104*a* are shown in FIG. 2, and the two connection lugs 104*a* are oppositely arranged on one side of the second support 104 close to the connection surface 12. The connection surface 12 is provided with through holes for the connection lugs 104*a* to pass through. The moving device 6 is fixedly installed between the two connection lugs 104*a* after penetrating out of the housing 1. Of course, the number of connection lugs 104*a* is not limited to 2. A limiting plate 104*b* is arranged at one end of the second support 104, and used to limit the transmission mechanism.

The transmission mechanism includes a motor 201 and a gear set connected to the motor 201, wherein the gear set is installed in the transmission space between the first support 103 and the second support 104. The second support 104 is longer than the first support 103. The motor 201 is installed between the second support 104 and the first support 103 and at a position below the first locking portion 103*a* of the first support 103. The middle parts of the upper end and the lower end of the second support 104 are bent toward the connection surface 12 to form the connection lugs 104*a*. A side wall of one connection lug 104*a* extends to the middle and is bent toward the operation surface 11 to form a bent limiting plate 104*b*. An arc-shaped groove in the transmission mechanism, which cooperates with the motor 201, is formed in the middle of the bent limiting plate 104*b*. The arc-shaped groove specifically allows the rotating shaft of the motor 201 to pass through, and preferably, the arc-shaped groove in the lower side of the limiting plate 104*b* facilitates the stable installation of the motor 201. A plurality of mounting holes in which gear sets are installed is formed in the plate surface of the second support 104. The second support 104 is provided with a connection lug 104*a* penetrating out of the housing 1 and a limiting plate 104*b* for fixing the motor 201, such that the second support 104 is stably fixed in the housing 1 of the circuit breaker, which is beneficial to provide a stable operating environment for the transmission mechanism.

Further, the first support 103 and the second support 104 are preferably made of a metal material, which is beneficial to increase the use strength and prolong the service life.

The above content is a further detailed description of the present invention in conjunction with specific preferred embodiments, and it cannot be considered that the specific embodiments of the present disclosure are limited to these descriptions. For those of ordinary skill in the technical field to which the present invention belongs, several simple deductions or substitutions can be made without departing from the concept of the present invention, which should be regarded as falling within the protection scope of the present invention.

What is claimed is:

1. An electric operating device for a circuit breaker, comprising a housing, wherein a transmission mechanism is installed in the housing, and a side wall of the housing serves as an operation surface and is provided with a first sliding groove communicated with the interior of the housing; a sliding rod is installed in the housing; a driving member controlled by the transmission mechanism is installed on the sliding rod; the driving member is provided with a closing operation portion and an opening operation portion; the driving member passes through the first sliding groove and extends out of the housing; the driving member moves along the sliding rod under the control of the transmission mechanism; and the closing operation portion and the opening operation portion operate a handle of the circuit breaker to be closed and opened respectively; wherein the transmission mechanism comprises a motor and a gear set connected to the motor; the gear set comprises an opening and closing output gear which is provided with a transmission shaft; the driving member is provided with a linkage groove cooperating with the transmission shaft; the motor drives the gear set to rotate; and the driving member slides on the sliding rod through the cooperation between the driving shaft of the opening and closing output gear and the linkage groove of the driving member, so as to operate the handle of the circuit breaker to be closed or opened.

2. The electric operating device for the circuit breaker according to claim 1, wherein the opening and closing output gear is an oval gear.

3. The electric operating device for the circuit breaker according to claim 1, wherein a side wall on the housing, which is opposite to the operation surface serves as a connection surface; and the moving device for driving the housing to move is installed on the connection surface.

4. The electric operating device for the circuit breaker according to claim 1, wherein the opening and closing output gear comprises a closing output gear and an opening output gear; the transmission shaft on the opening and closing output gear comprises a closing transmission shaft arranged on the closing output gear and an opening transmission shaft arranged on the opening output gear; the driving member comprises a closing driving member and an opening driving member; and the closing driving member and the opening driving member are respectively provided with linkage grooves cooperating with the closing transmission shaft and the opening transmission shaft.

5. The electric operating device for the circuit breaker according to claim 4, wherein the gear set further comprises a control gear; a raised trigger table is arranged on the control gear; a plurality of position identification switches is arranged at intervals on a circumference coaxial with the control gear to cooperate with the trigger table; the plurality of position identification switches comprise an initial position identification switch, a closing position identification switch, and an opening position identification switch; the motor drives the closing output gear and the control gear to rotate in the closing process; the closing output gear rotates in a closing direction, and the closing operation portion operates the handle of the circuit breaker to be closed through the closing transmission shaft; when the trigger table triggers the closing position identification switch, the motor rotates reversely; when the trigger table triggers the initial position identification switch, the closing operation portion returns to an initial position, and the motor stops rotating; and the motor drives the opening output gear and the control gear to rotate in the opening process; the opening output gear rotates in an opening direction, and the opening operation portion operates the handle of the circuit breaker to be opened through the opening transmission shaft; when the trigger table triggers the opening position identification switch, the motor rotates reversely; and when the trigger table triggers the initial position identification switch, the opening operation portion returns to the initial position, and the motor stops rotating.

6. The electric operating device for the circuit breaker according to claim 4, wherein both the closing output gear and the opening output gear are oval gears.

7. The electric operating device for the circuit breaker according to claim 6, wherein the closing output gear and the opening output gear are meshed with each other; in the early stage of closing, an oval long side of the opening output gear is in contact and cooperation with an oval short side of the closing output gear, such that the closing operation portion obtains a larger closing driving force; and in the later stage of closing, the oval short side of the opening output gear is in contact and cooperation with the oval long side of the closing output gear, such that the closing operation portion obtains a faster closing speed.

8. The electric operating device for the circuit breaker according to claim 6, wherein the gear set also comprises a three-stage gear; the closing output gear and the three-stage gear are driven by the same rotating shaft; a rotating shaft of the closing output gear is provided eccentrically; the opening output gear is meshed with the closing output gear; a rotating shaft of the opening output gear is provided eccentrically; the closing output gear is provided with a closing transmission shaft for connecting with the closing transmission member; and the opening output gear is provided with an opening transmission shaft for connecting with the opening driving member.

9. The electric operating device for the circuit breaker according to claim 4, wherein the closing driving member comprises a first linkage member and a closing member, wherein the first linkage member is installed on the sliding rod, the closing member is installed on the sliding rod and is in linkage with the first linkage member, the first linkage member is provided with a first linkage groove cooperating with the closing transmission shaft, and the closing member is provided with a closing operation portion; and/or the opening driving member comprises a second linkage member and an opening member, wherein the second linkage member is installed on the sliding rod, the opening member is installed on the sliding rod and is in linkage with the second linkage member, the second linkage member is provided with a second linkage groove cooperating with the opening transmission shaft, and the opening member is provided with an opening operation portion.

10. The electric operating device for the circuit breaker according to claim 9, wherein an elastic buffer member is arranged between the first linkage member and the closing member, and/or an elastic buffer member is arranged between the second linkage member and the opening member.

11. The electric operating device for the circuit breaker according to claim 9, wherein the first linkage member is of a U-shaped structure which is formed by sequentially connecting a first linkage wall, a third linkage wall and a second linkage wall and has an opening facing the first sliding groove; the first linkage groove is formed in the third linkage wall; each of the first linkage wall and the second linkage wall which are opposite to each other is provided with a through hole for the sliding rod to pass through; the closing member is arranged inside the first linkage member, and is of a U-shaped structure which is formed by sequentially connecting a first side wall, a first connecting wall and a second side wall; each of the first side wall and second side wall which are opposite to each other is provided with a through hole for the sliding rod to pass through; the sliding rod between the second side wall and the first linkage member is sleeved with an elastic buffer member; the second linkage member is of a U-shaped structure which is formed by sequentially connecting a fourth linkage wall, a sixth linkage wall and a fifth linkage wall; each of the fourth linkage wall and the fifth linkage wall which are opposite to each other is provided with a through hole for the sliding rod to pass through; the second linkage groove is formed in the fourth linkage wall; the closing member is arranged inside the second linkage member, and is of a U-shaped structure which is formed by sequentially connecting a third side wall, a second connecting wall and a fourth side wall; each of the third side wall and the fourth side wall which are opposite to each other is provided with a through hole for the sliding rod to pass through; the opening member is located between the fourth linkage wall and the fifth linkage wall; and the sliding rod between the fourth side wall and the fourth linkage wall is sleeved with an elastic buffer member.

12. The electric operating device for the circuit breaker according to claim 11, wherein the first linkage wall is provided with a connecting groove for connecting with the closing member; the first connecting wall passes through the connecting groove of the first linkage member, such that the second side wall of the closing member is located inside the first linkage member; the closing operation portion is arranged on the first side wall; the closing operation portion extends out of the first sliding groove and is formed by extending from a middle edge of the first side wall to the first sliding groove; the end of the closing operation portion is bent downward; and the opening operation portion is arranged on the third side wall; the opening operation portion is integrally formed by the third side wall; the opening operation portion is entirely in a form of a U-shaped body with an upward opening; and the U-shaped body has a long side wall for connecting with the third side wall and a short side wall for contacting with the handle of the circuit breaker.

13. The electric operating device for the circuit breaker according to claim 9, wherein each of the first linkage groove and the second linkage groove comprises an open end and a closed end; the closed end of the first linkage groove cooperates with the closing transmission shaft to drive the first linkage member to move; the open end of the first linkage groove is used to enable the closing transmission shaft to be rotated out after the closing is completed, thereby realizing the separation from the first linkage member; the closed end of the second linkage groove cooperates with the opening transmission shaft to drive the second linkage member to move; and the open end of the second linkage member is used to enable the opening transmission shaft to be rotated out after the opening is completed, thereby realizing the separation from the second linkage member.

14. The electric operating device for the circuit breaker according to claim 13, wherein the open end of the first linkage groove and the open end of the second linkage groove are staggered; and a direction from the open end to the closed end of the first linkage groove is opposite to a direction from the open end to the closed end of the second linkage groove.

15. The electric operating device for the circuit breaker according to claim 13, wherein the first linkage groove comprises a first straight segment and a first circular arc segment that communicate with each other; the first straight segment is perpendicular to the sliding rod; the closed end is located at the end of the first straight segment; the open end is located at the end of the first circular arc segment; and the second linkage groove comprises a second straight segment and a second circular arc segment that are communicated in sequence, wherein the second straight segment is parallel to the sliding rod; the second circular arc segment is close to a semi-circular arc shape; the closed end is located at the end of the second circular arc segment; one side of the second circular arc segment is a circular arc side wall, and the other side thereof is a straight side wall; and the open end is located at the end of the second straight segment.

* * * * *